US006268048B1

(12) United States Patent
Topolkaraev et al.

(10) Patent No.: US 6,268,048 B1
(45) Date of Patent: Jul. 31, 2001

(54) POLY(ETHYLENE OXIDE) FILMS COMPRISING UNMODIFIED CLAY PARTICLES AND HAVING ENHANCED BREATHABILITY AND UNIQUE MICROSTRUCTURE

(75) Inventors: Vasily A. Topolkaraev, Appleton; Thomas A. Eby, Greenville, both of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/474,625

(22) Filed: Dec. 29, 1999

Related U.S. Application Data
(60) Provisional application No. 60/114,328, filed on Dec. 31, 1998.

(51) Int. Cl.[7] .................................................. B32B 3/26
(52) U.S. Cl. ..................... 428/304.4; 521/50; 428/113; 428/634; 428/402
(58) Field of Search ........................ 521/50; 428/113, 428/304.4, 364, 402

(56) References Cited

U.S. PATENT DOCUMENTS

| | | |
|---|---|---|
| 3,759,729 | 9/1973 | Fahn . |
| 3,895,155 * | 7/1975 | Shukuri et al. .................. 428/206 |
| 4,144,065 * | 3/1979 | Lambert et al. .................. 96/29 D |
| 4,276,339 * | 6/1981 | Stoveken ........................ 428/153 |
| 4,317,765 * | 3/1982 | Gaylord .......................... 523/204 |
| 4,902,553 * | 2/1990 | Hwang et al. ................... 428/156 |
| 5,075,153 * | 12/1991 | Malhotra ......................... 428/207 |
| 5,244,714 * | 9/1993 | Malhotra et al. ................ 428/195 |
| 5,672,424 * | 9/1997 | Malhotra et al. ................ 428/325 |

FOREIGN PATENT DOCUMENTS

| | | |
|---|---|---|
| 0278601 | 8/1988 | (EP) . |
| 0322777 | 7/1989 | (EP) . |

OTHER PUBLICATIONS

Ogata, N. et al. Poly(vinyl alcohol)– clay and Poly(ethylene oxide)–clay Blends Prepared Using Water as Solvent, *J. Appl. Polym. Sci.*, vol. 66(3), pp. 573–581, 1997.
Patent Abstracts of Japan, JP 61222536 (Mar. 10, 1986), Nippon Kayaku Co Ltd, 1986.
Patent Abstracts of Japan, JP 60200822 (Nov. 10, 1985), Agency of Ind Science & Technology, 1985.

* cited by examiner

*Primary Examiner*—Samuel A. Acquah
(74) *Attorney, Agent, or Firm*—Kilpatrick Stockton LLP (57) ABSTRACT

The present invention discloses filled polymer compositions having a unique porous microstructure and enhanced breathability. In one embodiment, the composition of the present invention is flushable and comprises a water-responsive polymer of ethylene oxide and unmodified clay or layered silicate composite. The compositions of present invention are useful for manufacturing breathable and flushable films, fibers and articles. Advantageously, breathable films, fibers and articles of the present invention can be formed economically and efficiently without foaming or stretching.

20 Claims, 4 Drawing Sheets

FIGURE 1

Table I

| Film Composition | Film Thick (mil) | Weight Before | W After | ΔW | Base Rate (g/m²day) | CF * | WVT Rate (g/m²day) | Adjusted WVT Rate (g/m²day per 1 mil) | Mean Adjusted WVT Rate (g/m²day per 1 mil) |
|---|---|---|---|---|---|---|---|---|---|
| Ex.B CELGARD® 2500 | 1.0 | 215.1 | 201 | 13.9 | 4394.3 | 1.14 | - | - | 5000 |
| Ex.B CELGARD® 2500 | 1.0 | 217.1 | 203 | 13.7 | 4334.4 | 1.15 | - | - | - |
| Ex.A POLYOX®N-80 | 1.3 | 215.8 | 209 | 7.1 | 2242.9 | - | 2570 | 3341 | 3584 |
| Ex.A POLYOX®N-80 | 1.6 | 218.0 | 211 | 6.6 | 2088.3 | - | 2393 | 3828 | - |
| Ex.2 70%POLYOX®N-80 + 30%Polargel NF | 2.3 | 217.0 | 211 | 5.7 | 1801.3 | - | 2064 | 4747 | 4822 |
| Ex.2 70%POLYOX®N-80 + 30%Polargel NF | 2.5 | 215.6 | 210 | 5.4 | 1709.8 | - | 1959 | 4897 | - |
| Ex.1 70%POLYOX®N-80 + 30%Claytone APA | 1.4 | 218.2 | 212 | 6.4 | 2018.9 | - | 2313 | 3238 | 3090 |
| Ex.1 70%POLYOX®N-80 + 30%Claytone APA | 1.4 | 217.4 | 211 | 6.7 | 2119.9 | - | 2429 | 3400 | - |
| Ex.1 70%POLYOX®N-80 + 30%Claytone APA | 1.2 | 217.9 | 212 | 6.1 | 1911.7 | - | 2190 | 2628 | - |
| Ex.6 60%POLYOX®N-80 + 40%Claytone APA | 1.3 | 217.9 | 212 | 6.0 | 1895.9 | - | 2172 | 2824 | 2824 |

* Mean CF of the 1 mil thick CELGARD® 2500 film samples of Table I = 1.15

FIGURE 2

Table II

| Film Composition | Film Thick (mil) | Weight Before | W After | ΔW | Base Rate (g/m²day) | CF * | WVT Rate (g/m²day) | Adjusted WVT Rate (g/m²day per 1 mil) | Mean Adjusted WVT Rate (g/m²day per 1 mil) |
|---|---|---|---|---|---|---|---|---|---|
| Ex.B CELGARD® 2500 | 1.0 | 216.1 | 202 | 14.4 | 4552.1 | 1.10 | - | - | 5000 |
| Ex.B CELGARD® 2500 | 1.0 | 217.7 | 203 | 15.1 | 4766.6 | 1.05 | - | - | - |
| Ex.B CELGARD® 2500 | 1.0 | 216.2 | 202 | 13.9 | 4372.3 | 1.14 | - | - | - |
| Ex.A POLYOX®N-80 | 2.6 | 217.8 | 212 | 5.5 | 1725.6 | - | 1893 | 4922 | 4813 |
| Ex.A POLYOX®N-80 | 2.4 | 217.0 | 211 | 5.6 | 1757.1 | - | 1928 | 4926 | - |
| Ex.A POLYOX®N-80 | 2.4 | 215.7 | 210 | 5.9 | 1858.1 | - | 2038 | 4892 | - |
| Ex.1 70%POLYOX®N-80 + 30%Claytone APA | 2.6 | 218.2 | 215 | 3.2 | 1000.0 | - | 1097 | 2852 | 3326 |
| Ex.1 70%POLYOX®N-80 + 30%Claytone APA | 2.6 | 217.5 | 214 | 4.0 | 1255.5 | - | 1377 | 3581 | - |
| Ex.1 70%POLYOX®N-80 + 30%Claytone APA | 2.7 | 218.1 | 215 | 3.5 | 1101.0 | - | 1208 | 3261 | - |
| Ex.1 70%POLYOX®N-80 + 30%Claytone APA | 2.2 | 217.3 | 213 | 4.7 | 1495.3 | - | 1640 | 3609 | - |
| Ex.2 70%POLYOX®N-80 + 30%Polargel NF | 2.8 | 217.0 | 212 | 5.5 | 1738.2 | - | 1907 | 5339 | 5488 |
| Ex.2 70%POLYOX®N-80 + 30%Polargel NF | 3.0 | 217.4 | 212 | 5.5 | 1722.4 | - | 1889 | 5668 | - |
| Ex.2 70%POLYOX®N-80 + 30%Polargel NF | 2.7 | 218.6 | 213 | 5.8 | 1842.3 | - | 2021 | 5457 | - |

* Mean CF of the 1 mil thick CELGARD® 2500 film samples of Table II = 1.10

FIGURE 3

Table III

| Film Composition | Film Thick (mil) | Weight Before | W After | ΔW | Base Rate (g/m²day) | CF* | WVT Rate (g/m²day) | Adjusted WVT Rate (g/m²day per 1 mil) | Mean Adjusted WVT Rate (g/m²day per 1 mil) |
|---|---|---|---|---|---|---|---|---|---|
| Ex.B CELGARD® 2500 | 1.0 | 215.2 | 201 | 13.8 | 4337.6 | 1.15 | - | - | 5000 |
| Ex.B CELGARD® 2500 | 1.0 | 216.5 | 203 | 14.0 | 4413.3 | 1.13 | - | - | - |
| Ex.B CELGARD® 2500 | 1.0 | 215.6 | 202 | 14.1 | 4451.1 | 1.12 | - | - | - |
| Ex.A POLYOX®N-80 | 6.3 | 218.7 | 216 | 3.0 | 955.8 | - | 1086 | 6843 | 7281 |
| Ex.A POLYOX®N-80 | 7.3 | 217.2 | 214 | 3.0 | 930.6 | - | 1058 | 7720 | - |
| Ex.2 70%POLYOX®N-80 + 30%Polargel NF | 6.3 | 218.3 | 213 | 5.1 | 1605.7 | - | 1825 | 11495 | 11506 |
| Ex.2 70%POLYOX®N-80 + 30%Polargel NF | 6.3 | 220.3 | 215 | 5.1 | 1608.8 | - | 1828 | 11518 | - |
| Ex.1 70%POLYOX®N-80 + 30%Claytone APA | 7.6 | 217.8 | 216 | 2.0 | 640.4 | - | 728 | 5530 | 5142 |
| Ex.1 70%POLYOX®N-80 + 30%Claytone APA | 6.5 | 218.7 | 217 | 2.0 | 643.5 | - | 731 | 4753 | - |
| Ex.3 70% POLYOX® 12K + 30%Polargel T | 8.2 | 218.8 | 216 | 3.0 | 955.8 | - | 1086 | 8906 | 8787 |
| Ex.3 70% POLYOX® 12K + 30%Polargel T | 7.8 | 219.1 | 216 | 3.1 | 977.9 | - | 1111 | 8668 | - |
| Ex.4 55%POLYOX® 12K + 45 % CaCO₃ + 193S | 4.7 | 219.4 | 215 | 4.0 | 1277.6 | - | 1464 | 6880 | 6961 |
| Ex.4 55%POLYOX® 12K + 45 % CaCO₃ + 193S | 4.5 | 217.2 | 213 | 4.3 | 1365.9 | - | 1565 | 7042 | - |
| Ex.5 55%POLYOX® 12K + 45 % CaCO₃ + FF400 | 5.8 | 212.8 | 209 | 3.5 | 1110.4 | - | 1272 | 7379 | 7379 |

* Mean CF of the 1 mil thick CELGARD® 2500 film samples of Table III = 1.14

FIGURE 4

POLY(ETHYLENE OXIDE) FILMS COMPRISING UNMODIFIED CLAY PARTICLES AND HAVING ENHANCED BREATHABILITY AND UNIQUE MICROSTRUCTURE

CROSS-REFERENCES TO RELATED APPLICATIONS

This application claims the benefit of U.S. Provisional Application No. 60/114,328, filed Dec. 31, 1998.

FIELD OF THE INVENTION

The present invention relates to compositions for manufacturing breathable and flushable films, fibers and articles. Particularly, the present invention relates to compositions and films comprising a blend of a water-responsive polymer of ethylene oxide and particles selected from the group consisting of clay and layered silicate particles.

BACKGROUND OF THE INVENTION

Disposable personal care products such as pantiliners, diapers, tampons, etc. are a great convenience. Disposable products provide the benefit of one time, sanitary use and are convenient, quick and easy to use. However, disposal of these products is a concern. Incineration of these products is also not desirable because of increasing concerns about air quality and the costs and difficulty associated with separating these products from other disposed, non-incineratable articles. Dumping of these products is also undesirable due to concerns with limited landfill space and increasing land cost. Consequently, there is a need for disposable products which may be quickly and conveniently disposed of without dumping or incineration.

It has been proposed to dispose of these products in municipal and private sewage systems. Ideally, these products would be flushable and degradable in conventional sewage systems. Articles suited for disposal in sewage systems that can be flushed down conventional toilets are termed "flushable." Disposal by flushing provides the additional benefit of providing a simple, convenient and sanitary means of disposal. Personal care products must have sufficient strength under the conditions in which they will be used. Thus, it is desirable for personal care products to withstand the elevated temperature and humidity conditions encountered during use, yet lose integrity upon contact with water in the toilet. It is also desirable that these personal care products are breathable in order avoid the build-up of perspiration and increase the level of comfort of the consumers of these products. Therefore, a breathable material having mechanical integrity when dry and that readily disintegrates upon immersion in water is highly desirable.

Due to its unique interaction with water and body fluids, poly(ethylene oxide) (hereinafter PEO) is currently being considered as a component material for water-sensitive compositions. PEO, is a commercially available, water-responsive polymer that can be produced from the ring opening polymerization of the ethylene oxide, Because of its water-responsive properties, PEO is desirable for flushable applications. However, conventional PEO films are not as breathable as desired for many personal care applications and are difficult to process using conventional processing techniques.

Many have attempted to overcome these difficulties. U.S. Pat. No. 4,902,553 to Huang et al. describes disposable articles comprising a liquid impermeable, vapor permeable film. The liquid impermeable, vapor permeable film described by Huang et al. comprises a crystallizable, stretched polyolefin-based film and a rattle-reducing additive which may be poly(ethylene oxide). However, the liquid impermeable, vapor permeable films of U.S. Pat. No. 4,902,553 require at least one nucleating agent which may be talc or calcium carbonate and stretching to achieve breathability. The amounts of nucleating agent are limited to very small amounts, 0.05 to 5 percent by weight. These amounts of inorganic, nucleating agent are insufficient to be defined as fillers. Further, stretching is required to generate porosity and hence breathability and subsequent leaching of the rattle-reducing agent is desired. In contrast, the films of the present invention are based on a water-responsive polymer and not the non-water-soluble and non-water-degradable polyolefins described by Huang et al. Advantageously, the films of the present invention do not require stretching, a nucleating agent or a crystallizable polyolefin for breathability.

U.S. Pat. No. 3,895,155 describes coated, transparent plastic articles. The transparent plastic may comprise poly (ethylene oxide). An inorganic, protective coating is applied as a separate layer over the transparent plastic article to improve surface hardness, increase stretch resistance, and facilitate non-fogging. The inorganic, protective coating may comprise various metal oxides. However, the coating forms a separate, discrete, glass-like layer from the transparent plastic article and the resulting coating and articles are not breathable or flushable.

U.S. Pat. Nos. 5,075,153, 5,244,714, and 5,672,424 to Malhotra et al. describe multilayered or coated recording sheets designed for electrostatic printing processes. The recording sheets comprise a base sheet with an anti-static layer, which may be made from poly(ethylene oxide). The recording sheets comprise an additional toner-receiving layer, which comprises inorganic oxides such as silicon dioxide, titanium dioxide, calcium carbonate, or the like. The poly(ethylene oxide) and inorganic oxides are contained in separate layers, the anti-static layer and the toner-receiving layer respectively. Further, the recording sheets are not breathable or flushable.

U.S. Pat. No. 4,276,339 to Stoveken describes a laminated product comprising a paper layer and a foamed layer. Poly(ethylene oxide) is described as one of many possible components of an aqueous dispersion of latexes from which the foamed layer is made. Inorganic fillers such as clay or silica are suggested as possible additions to the aqueous dispersion of latexes in order to increase the solids content and density of the aqueous dispersion of latexes. The aqueous dispersion from which the foamed layer is made must be capable of being foamed and requires foaming in order to be breathable.

Thus, currently available PEO films are not practical for breathable or flushable applications. What is needed in the art, therefore, is a means to efficiently and economically produce breathable and flushable films, fibers and articles and a method of controlling the breathability of these breathable and flushable films fibers and articles. Further, what is needed in the art is a composition for making water-responsive, environmentally degradable and breathable films that do not require stretching, foaming, air entraining or a foaming agent in order to be breathable.

SUMMARY OF THE INVENTION

The present invention provides compositions having enhanced breathability comprising a water-responsive polymer, that is optionally environmentally degradable, and unmodified clay particles. Desirable water-responsive polymers include polymers and copolymers of ethylene oxide. Desirable clays include various clays and layered silicate that have not been organically modified. Films, fibers and articles made from the compositions of the present invention may be incorporated into personal care articles that are flushable and optionally environmentally degradable that require breathability.

Films made from the compositions of the present invention possess a unique nanoporous structure. The unique nanoporous structure is believed to provide enhanced breathability. Films, fibers and articles made from the compositions disclosed herein can be manufactured such that the films, fibers and articles are both breathable and flushable. Advantageously, the films, fibers and articles can be made breathable without stretching or foaming of the film, fiber or article and the breathability is enhanced and can be controlled.

The water-responsive polymer component of the compositions of the present invention forms the matrix of the composite and the clay particles are dispersed throughout the polymer matrix. An example of the unique nanoporous microstructure possessed by films formed form compositions of the present invention is provided in FIG. 1. The structure can be described as an "enveloped house of cards," where the cards are clay platelets and bundles and stacks of clay platelets and the PEO is the polymer coating enveloping and holding the cards in their positions. It is believed that the unique structure results from the separation or intercalation of clay platelets and bundles and stacks of clay platelets by a layer of polymer. The separated clay layers and particles appear to provide the rigidity to the structure and create the nanoscale porosity.

In one embodiment, films made from compositions in accordance with the invention comprise a distribution of nanoscale pores or void spaces having diameters ranging from about 10 nanometers to about 10,000 nanometers. These films have enhanced breathability and are water dispersible and can be flushed in conventional toilets and are environmentally degradable. Advantageously, high breathability of films of the present invention may be achieved without the use of foaming, foaming agents, air entraining or stretching and can be controlled. The compositions of the present invention and films and fibers comprising the compositions are especially useful for manufacturing personal care articles with potential flushable applications and environmentally degradable applications, such as, flushable diapers, feminine pads, pantiliners, training pants, and other articles incorporating breathable compositions and fils. The compositions of the present invention and films and fibers therefrom are also useful for manufacturing health care articles, such as, bandages and wound dressings.

Key variables that effect the microstructure of the composites of the invention include, but are not limited to: filler type, filler particle size and size distribution, filler activity which may be modified or unmodified, and molecular weight and selection of the polymer component(s). Desirably, the filler particles have an average particle size, which is not more than about 50 microns. More desirably, the particles have an average particle size that is not more than about 10 microns, and still more desirably, the particles have an average particle size that is not more than about 5 microns. Reduced particle sizes provide improved dispersion and processability.

Also, desirably the filler particles comprise bundles or stacks of many extremely small platelets, which are dipolar. The term "dipolar" as used herein means that platelets posses different charges on the outer edges and on the flat surfaces, desirably positive charges are on the outer edges of the platelets and negative charges are on the flat surfaces of the platelets. The bundles or stacks of platelets should desirably have high aspect ratios. The aspect ratio is the ratio of the surface width of a particle to its thickness. The aspect ratio, desirably is not less than 3:1, more desirably the aspect ratio is not less than 5:1, and still more desirably is not less than 10:1. The aspect ratio desirably is not more than 15,000:1, more desirably is not more than 5000:1, and even more desirably is not more than about 2000:1.

DETAILED DESCRIPTION OF THE INVENTION

Compositions in accordance with the present invention comprise at least two components: (1) a polymer that is water-responsive and optionally environmentally degradable, and (2) clay particles that have not been organically modified, including but not limited to, unmodified clays, layered silicates, and mixtures thereof. The present invention is demonstrated by the use of a polymer of ethylene oxide as the water-responsive polymer component of the compositions of the present invention. Advantageously, the polymers of ethylene oxide used in the Examples are both water-responsive and environmentally degradable. The addition of unmodified clay or layered silicate particles to the polymer unexpectedly enhances the breathability of the polymer. The compositions described herein are useful for producing films having enhanced breathability that are flushable and optionally environmentally degradable.

Prior art suggests that blending or incorporation of clay or layered silicate particles having high aspect ratio into polymer matrix significantly enhances the barrier properties to gases and vapors. The barrier property is significantly enhanced because the high aspect ratio inorganic platelets are impermeable to gases and vapors and create a highly tortuous path for vapor to penetrate through the polymer matrix. Unexpectedly, by melt extrusion of the solid blend of water-responsive, environmentally degradable polymer and unmodified clay particles, we significantly reduced the barrier property and improved the water vapor permeability and the breathability of the melt extruded material.

Figure 1:
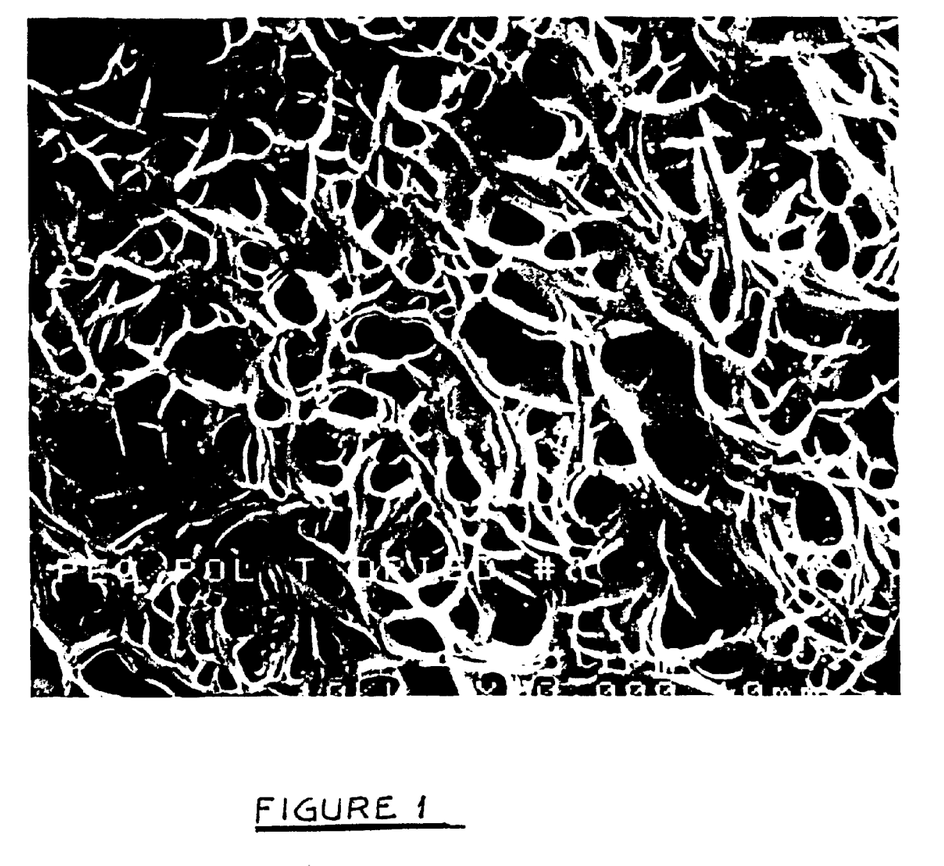
FIG. 1 is an SEM image of a cross-section of a film comprising a blend of about 70 parts of poly(ethylene oxide) and 30 parts of Polargel T clay.
Figure 2:
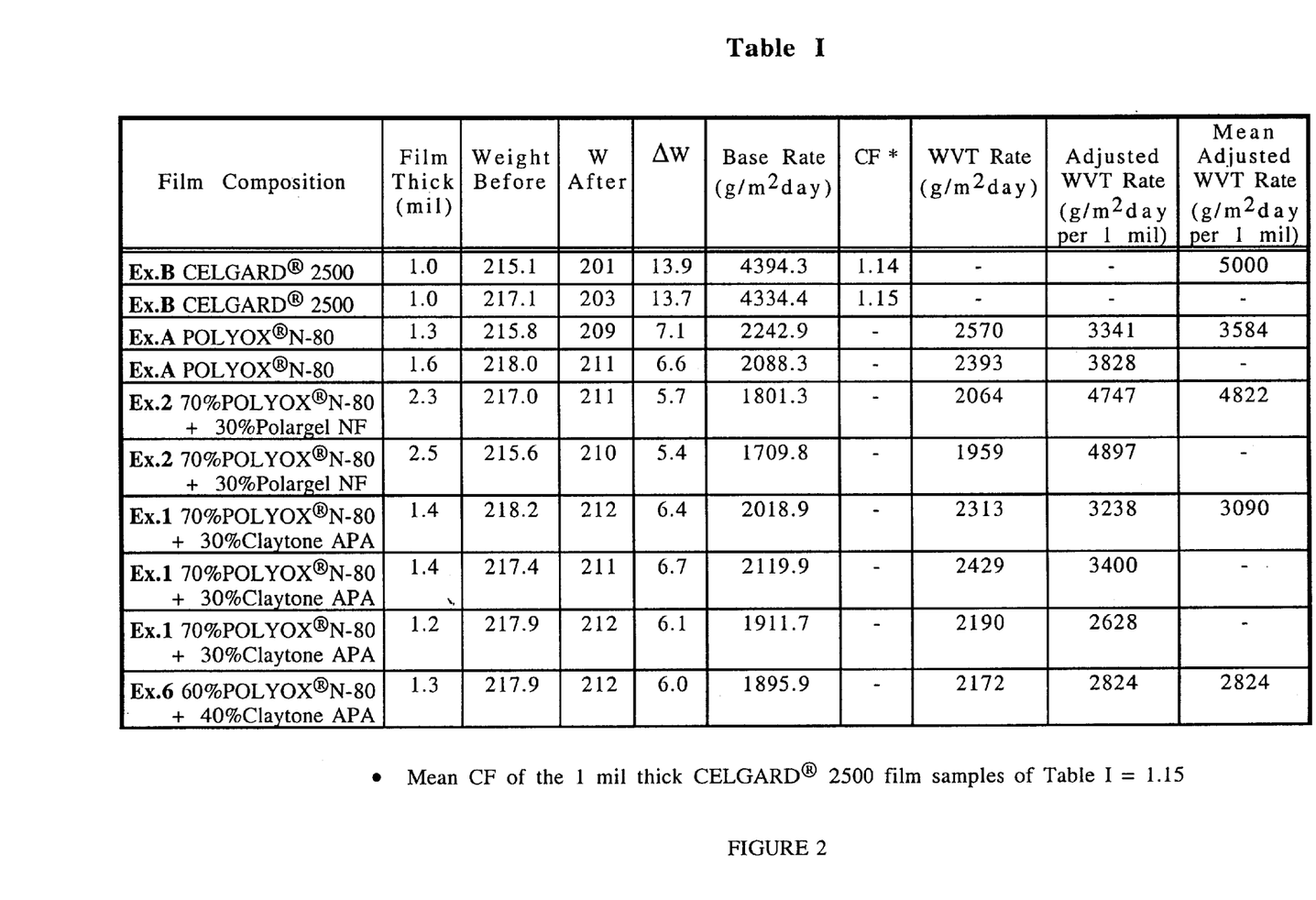
FIG. 2 is Table I presenting water vapor transmission data for unfilled PEO films, unmodified clay filled PEO flins and organically modified clay filled PEO films of thicknesses ranging from 1.2 to 2.5 mil.
Figure 3:
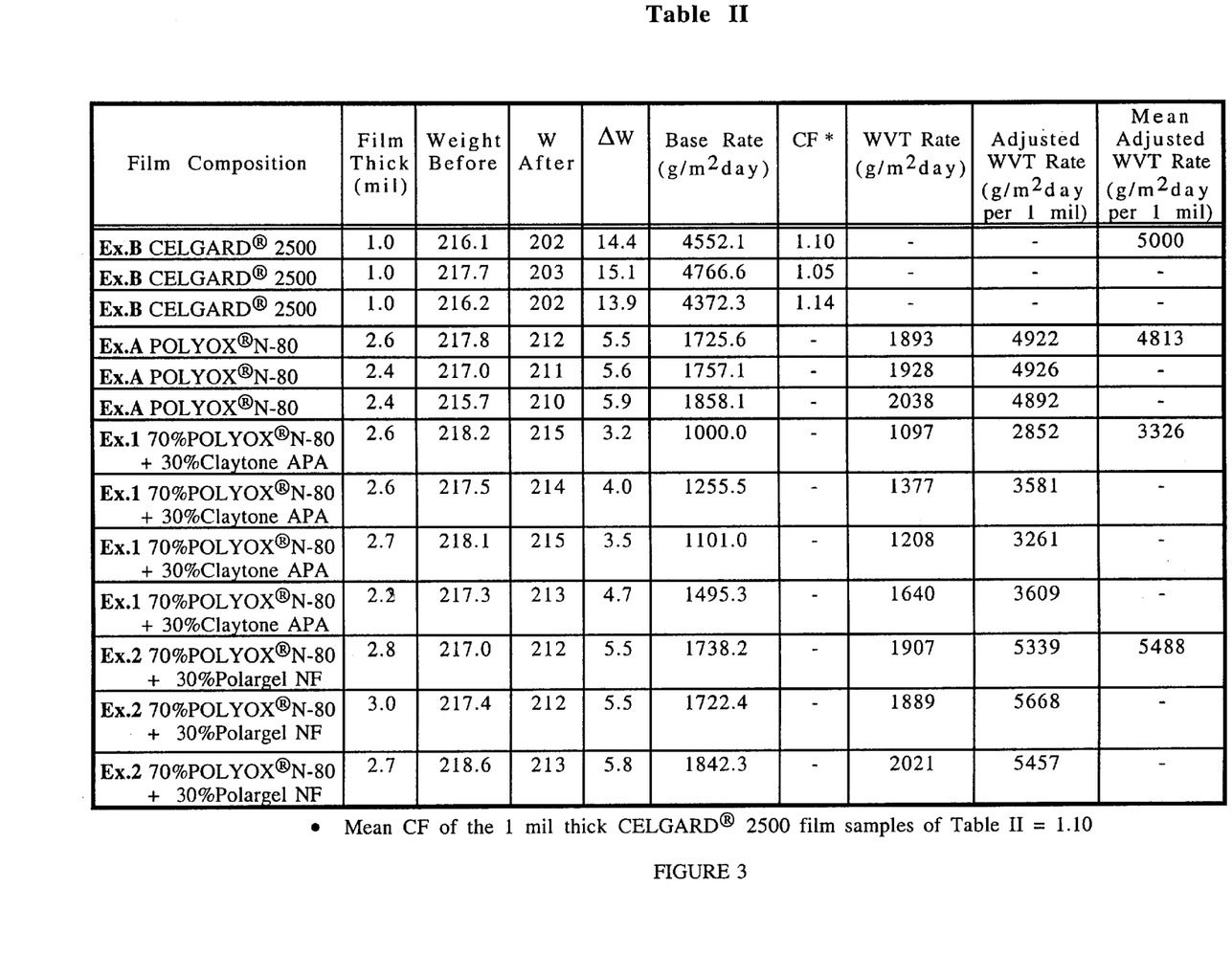
FIG. 3 is Table II presenting water vapor transmission data for unfilled PEO films, unmodified clay filled PEO films and organically modified clay filled PEO films of thicknesses ranging from 2.2 to 3.0 mil.
Figure 4:
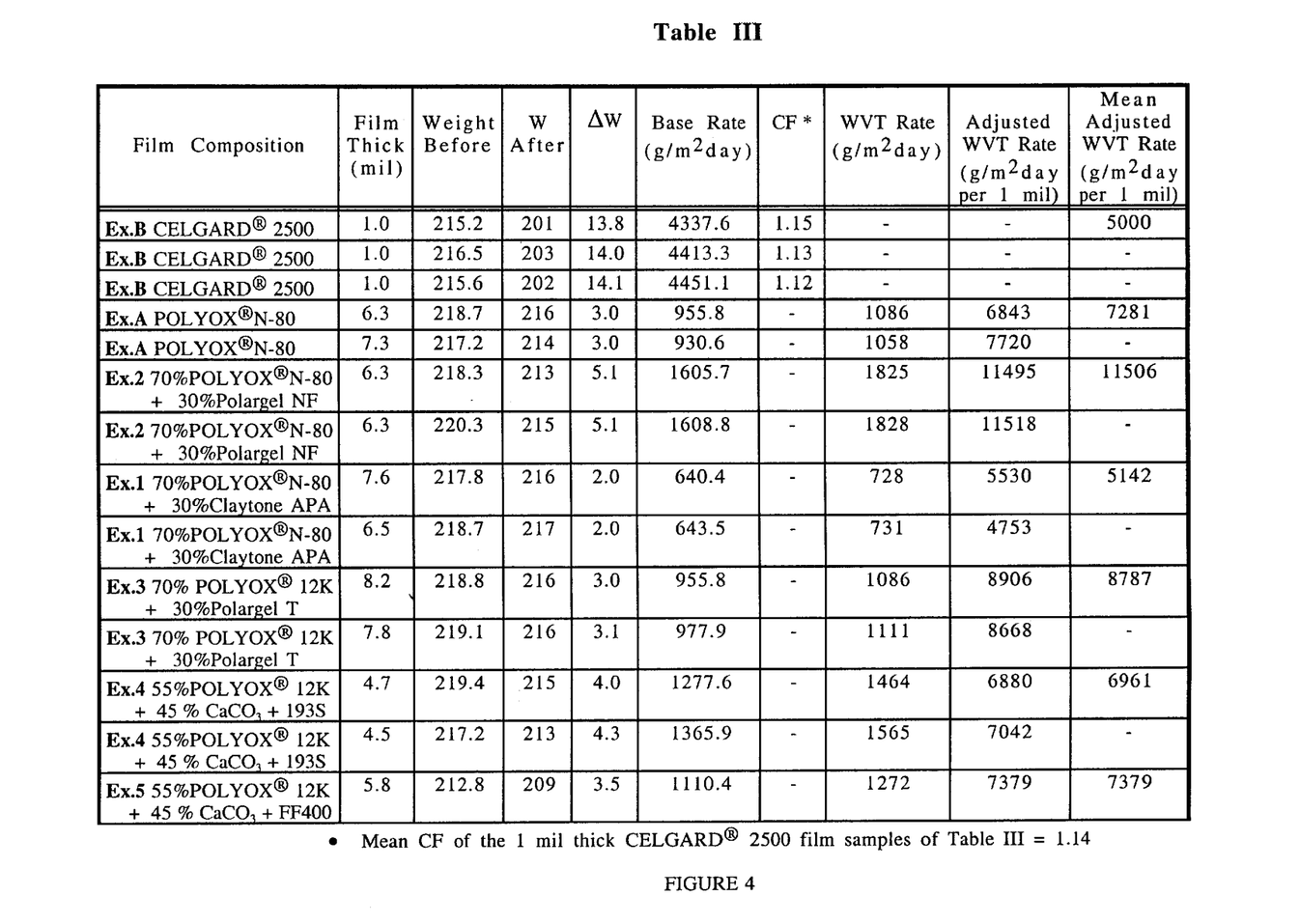
FIG. 4 is Table III presenting water vapor transmission data for unfilled PEO films, unmodified clay filled PEO films, organically modified clay filled PEO films and calcium carbonate filled PEO films of thicknesses ranging from 4.5 to 8.2 mil.

It is believed that unexpectedly enhanced breathability of the films presented herein is a result of the unique, cellular nanostructure resulted from the melt extruded solid blend of the water-responsive polymer and the clay. The unique, nanostructure is characterized as a network of nanoscale pores of void spaces distributed through the polymer phase that forms the matrix of the composite. The void spaces or pores are distributed fairly uniformly throughout the composite matrix and impart desired porosity and enhanced breathability to films made from the compositions. The "nanoporous" morphology of the compositions of the present invention can be described as randomly distributed void spaces produced by intersection of surfaces of fiber-like elements formed from the polymer and clay components of the compositions. The micrograph provided in FIG. 1 presents a cross-section of a film in accordance with the present invention comprising a water-responsive polymer, PEO, and unmodified clay particles. The unique nanoporous structure of the compositions of the present invention in addition to improving breathability can also improve the accessibility of moisture into the compositions and enhance the rate of environmental degradation of the compositions.

The porous structure includes voids having spherical shape and elongate voids of generally ellipsoidal shape. The structures include voids with pore sizes that have a major axis length which is at least about 0.01 microns ($\mu$m). Alternatively, the length of the major axis can be at least about 0.1 microns. In other embodiments, the length of the major axis is desirably not more than about 10 microns and, optionally, is not more than about 5 microns. The void morphology can be characterized by average pore size and the area of the coverage of the pores in the cross-sectional area of films of the compositions.

Films produced from the compositions disclosed herein are breathable without the use of foaming agents, air entraining or stretching. Thus, the compositions described herein represent an efficient, alternative approach for developing breathable materials for flushable applications. The manufacture of breathable films from the compositions of the present invention offers various advantages over conventional techniques for forming breathable films. Enhanced breathability of the compositions suggests improved accessibility of moisture into the compositions which can be beneficial to environmentally degradation of the compositions and articles and products made with the compositions of the present invention.

The process of making flushable and breathable films, fibers and articles in accordance with the present invention includes the preparation of a composite formed by blending a polymer that is water-responsive and particles of clay or layered silicates. The water-responsive polymer component forms the matrix of the composite. Although, the present invention is demonstrated in the following examples by the use of polyethylene oxide), other known water-responsive and environmentally degradable polymers may be used as the polymer component of the blend and include water-responsive polymers containing polar, ionic, and/or cationic groups and or groups with strong dipole moments that can efficiently interact with the charges on the surfaces and the edges of the clay and layered silicate platelets. These polymers include, but are not limited to, polymers and copolymers of ethylene oxide, particularly homopolymers, modified polymers and graft copolymers of ethylene oxide; polymers of vinyl alcohol; poly(vinyl pyrrolidone), polyethyloxazoline, water-responsive acrylic acid based copolymers, polar polymers having ester groups such as polylactides, and mixtures, blends and derivatives of the above. Suggested water responsive, environmentally degradable polymers include polylactic acid, polycaprolactone, poly(butylene succinate adipate), polybutylene succinate, poly(ethylene glycol) and water responsive blends, mixtures and derivatives of the above. Polylactic acid-poly(ethylene oxide) copolymers are also useful for the present invention. In the examples, the water-responsive polymer is a polymer or copolymer of ethylene oxide, more particularly a homopolymer of ethylene oxide. As used herein, the term "polymer" includes homopolymers, copolymers, terpolymers and modifications thereof. "Environmentally degradable" as used herein relative to a composition or article means that the composition or article is degradable under the action of water, heat or naturally occurring microorganisms such that a significant change in the structure of the material, including a reduction in molecular weight or a change in chemical structure, or a significant loss of properties, such as mechanical integrity, mechanical strength, stiffness or elastic modulus, or fragmentation occurs.

The selection of the water-responsive polymer is based on consideration of key variables including, but not limited to, water responsiveness, environmental degradability, controlled molecular weight, melt processability, strength and ductility. In the following examples, several commercially available poly(ethylene oxide) resins (hereinafter abbreviated as PEO) were selected as the water-responsive polymer component of the blend. Although the present invention is demonstrated by the use of PEO as the polymer component, the scope of the present invention is not limited to PEO and can be expanded to other water responsive polymers containing polar, ionic, cationic functional groups and/or groups with strong dipole moments, which can efficiently interact with the charged surfaces and edges of the platelets of clay and layered silicate particles. Further, the PEO resin can be chemically modified by grafting, reactive extrusion, block polymerization or branching to improve its processability in a melt and performance in a solid state. The PEO resin can be modified by reactive extrusion or grafting as described in more detail in copending application U.S. Ser. No. 09/002, 197 which is incorporated herein by reference in its entirety.

As used herein, the term "water-dispersible" refers to the ability of a polymer, composition, film article, etc. to dissolve or break into pieces smaller than 20 mesh after being immersed in water for approximately thirty minutes. The term "water-disintegratable" refers to the ability of a polymer, composition, film, article, etc. to break into multiple pieces within thirty minutes of immersion in water, wherein that some of the pieces are caught by a 20 mesh screen without slipping through in the same manner as a thread through the eye of a needle. The term "water-weakenable" refers to the ability of a polymer composition, film, article, etc. to remain in one piece, but weaken and lose some rigidity after thirty minutes of immersion in water and to become drapeable, i.e. it bends without an external force applied thereto when it is held by one side at a horizontal position. The term "water-stable" refers to a polymer, composition, film, article, etc., which does not become drapeable after thirty minutes of immersion in water and remains in one piece after the water response test. Herein, the term "water-responsive" refers to compositions, films, articles, etc. that are water-soluble, water-dispersible, water-disintegratable or water-weakenable.

Desirably, the modified and unmodified PEO resins useful as the water-responsive component of the present invention have molecular weights ranging from about 100,000 grams per mole to about 8,000,000 grams per mole (abbreviated hereinafter as g/mol). More desirably, the modified and unmodified PEO resins useful as the water-responsive component of the present invention have molecular weights ranging from about 100,000 g/mol to about 4,000,000 g/mol. The higher molecular weight PEO resins in these ranges are desirable for enhanced liquid stability, increased mechanical strength and ductility. Whereas, the lower molecular weight PEO resins provide better melt processability and film forming properties. Taking these factors into consideration, a still more desirable range of molecular weights of PEO as the water-soluble polymer component is from about 200,000 grams per mole to about 2,000,000 grams per mole (hereinafter g/mol).

One commercial supplier of PEO resins is Union Carbide Chemicals & Plastic Company, Inc. Examples of suitable PEO resins available from Union Carbide include, but are not limited to, resins sold under the following trade designations and reported average molecular weights: POLYOX® WSR N-80, a 200,000 g/mol PEO; POLYOX® WSR N-750, a 300,000 g/mol PEO; POLYOX® WSR N-3000, a 400,000 g/mol PEO; POLYOX® WSR 205 a 600,000 g/mol PEO; POLYOX® WSR N-12K a 1,000,000 g/mol PEO; POLYOX® WSR N-60K a 2,000,000 g/mol PEO; POLYOX® WSR N-301 a 4,000,000 g/mol PEO; and POLYOX® WSR N-308 a 8,000,000 g/mol PEO. (See also POLYOX®: *Water Soluble Resins*, Union Carbide Chemicals & Plastic Company, Inc., 1991 which is incorporated by reference herein in its entirety.) All of the PEO resins were supplied in powder form by Union Carbide. Both PEO powder and pellets of PEO were utilized in the examples of the present invention.

The PEO resins employed in the compositions, films and articles of the present invention may optionally contain various additives including, but not limited to, plasticizers, processing aids, fillers, dispersants, solid state modifiers, rheology modifiers, antioxidants, UV light stabilizers, pigments, colorants, slip additives, antiblock agents, polymer emulsions, etc. These additives may be added before, during or after blending the clay particles and the water-responsive polymer resin. For instance, water repellant additives of various compositions such as fluorosilicones, organosilicones, other fluorochemicals, and specialty waxes, may be added to the compositions of the present invention to further enhance the liquid stability of the compositions. Commercial examples of suggested water-repellant additive include, but are not limited to, FX-1801 fluorochemical supplied by 3M and TLF-8860 fluorinated melt additive supplied by DuPont. Additionally, various surfactants can be added to the water-responsive polymer resin before, during or after compounding with inorganic filler to control the resin interaction with inorganic filler and to improve filler dispersion.

The inorganic filler component of the compositions of the present invention forms the disperse phase of the composite. Desirably, at least one of the fillers comprises clay or layered silicate particles that have not been organically modified. The selection of filler material is based on consideration of key parameters including, but not limited to, particle size, expansion and swelling efficiency, and interaction with the polymer. Clays from the smectite group, such as various forms of montmorillonites and bentonites are desired for the present invention. In one embodiment of the present invention, the clay or layered silicate filler particles have an average particle size of not more than about 50 microns. More desirably, the average particle size is not more than about 10 microns, and even more desirably, the average particle size is not more than about 5 micron to provide improved dispersion and processability.

Also, desirably, the filler particles comprise bundles or stacks of many extremely small platelets, which are dipolar. Dipolar means that platelets posses different charges on the outer edges and on the flat surfaces, desirably the positive charges are on the outer edges, and negative charges are on the flat surfaces. More desirably, platelets have high aspect ratios. The aspect ratio of a platelet is the ratio of surface width of the platelet to its thickness. Still more desirably, the aspect ratio, desirably is not less than 3:1, and even more desirably the aspect ratio is not less than 5:1, and still more desirably is not less than 10:1. The aspect ratio desirably is not more than 15,000:1, more desirably is not more than 5000:1, and even more desirably is not more than about 2000:1.

Both treated and untreated clay particles and layered silicate particles may be incorporated into the compositions of the present invention. Examples of commercially available clay materials utilizable in the present invention include, but are not limited to, one or more of the following: Polargel T clay, a highly efficient form of purified white bentonite commercially available from Kraft Chemical Company of Melrose Park, Ill.; Polargel NF clay, a highly purified bentonite, commercially available from Kraft Chemical Company of Melrose Park, Ill.; Suspengel Ultra clay, a high purity bentonite, commercially available from Cimber Performance Minerals of Cartersville, Ga.; and Bentolite H clay, a highly activated montmorillonite, commercially available from Southern Clay Products, Inc. of Gonzales, Tex. Examples of commercially available synthetic clays utilizable in the present invention include various grades of Laponite, a colloidal synthetic layered silicate available from Southern Clay Products, Inc.

Clay particles having a pretreated or organically modified surface absorb organic substances more readily and are suitable as an additional filler component of the compositions of the present invention. Clay particles having a pretreated or modified surface are generally referred to herein as organoclays and organically modified clays. Organoclays and organically modified clays can exhibit increased compatibility with PEO. The bundles and stacks of organoclay and organically modified clay platelets can be uniformly dispersed in the polymer matrix during melt blending process without a formation of a distinctive cellular nanoporous structures of the compositions of the present invention while increasing the barrier properties of the material. That can result in a reduced breathability, see Examples 1 and 6. Suggested organically modified or treated clays include, but are not limited to, one or more of the following: Organoclay Claytone APA, activator-free dimethyl benzyl (hydrogenated tallow) ammonium bentonite; Claytone HY, activator-free, quaternary ammonium compound-modified bentonite; Claytone 40, dimethyl-bis (hydrogenated tallow) ammonium bentonite; and three organically modified clays obtained from Southern Clay Products, Inc. of Gonzales, Tex. and designated as SCPX-1121, SCPX-1122 and SCPX-1123. The particulate filler material is suitably present in the compositions of the present invention in an amount within the range of from about 1 weight percent to about 70 weight percent relative to the sum of the weight of the water-responsive polymer and the particulate filler material. Desirably, the amount of filler comprises from about 10 weight to about 60 weight percent of the blend composition and, even more desirably, the amount of filler comprises from about 20 weight to about 50 weight percent relative to the sum of water-responsive polymer and particulate filler material.

The present invention is demonstrated by the use of two of the above-mentioned unmodified clays: Polargel NF clay and Polargel T clay. These clay particles are employed in the following examples and have the following particles size distributions. The Polargel T clay particles have a geometric mean size of 2.74 microns with a geometric standard deviation of 2.07 microns. The Polargel NF clay particles have a geometric mean size of 2.01 microns with a geometric standard deviation of 1.87 microns. Additionally, an example comprising organically modified Claytone APA clay particles is presented for comparative purposes. Claytone APA clay particles of Example 1 have a geometric mean size of 0.93 microns with a geometric standard deviation of 1.74 microns. The particle size distributions of the clay particles, as obtained from the suppliers, were measured by Particle Technology Labs, Ltd. of Downers Grove Ill., using a computerized Elzone particle size analyzer.

Although clays and layered silicates uniquely interact with the water-responsive polymer and create nanopores therein, additional conventional fillers may be added to the compositions of the present invention to modify and control the porosity. In addition to the clay and/or layered silicate component in the compositions of the present invention, conventional fillers and organically modified clay particles may be added to change the appearance, opacity or softness of the compositions and are also considered within the scope of the present invention. Conventional fillers include, but are not limited to, calcium carbonate and titanium dioxide. One calcium carbonate filler, employed in the Example 4, is SUPERMITE® calcium carbonate filler, which is commercially available from ECC International of Sylacauga, Ala. The calcium carbonate filler particles may be surface modified with a surface-modifying agent or surfactants to improve their compatibility with a polymer. A suggested surface modifying agent includes, but is not limited to, a silicone glycol copolymer, to reduce the surface tension of the particles and improve interaction their with fluids. Suggested surfactants for surface modification of calcium carbonate include, but are not limited to, stearic acid and behenic acid. It is possible to modify the surface of the filler particles with a surface modifying agent having a Hydrophilic-Lipophilic Balance (abbreviated hereinafter as HLB) number ranging from 0 to about 15, desirably having a HLB number from about 6 to about 13. Liquid organosilicones suitable as surface modifying agents are commercially available from Dow Corning of Midland, Mich.

The polymer component employed to form the compositions of the present invention may be suitably intermixed with the clay and other optional fillers in powder or pellet form or otherwise combined using conventional mixing and blending techniques. Desirably, the water-responsive polymer component is mixed with the clay component and optional inorganic filler prior to melting. The mixture may be melt blended in any suitable apparatus, such as a blender, a single-screw extruder, a twin-screw extruder, etc. In the following examples, the process for blending the water-responsive polymer and inorganic filler is demonstrated on a lab scale, twin-screw extruder obtained from Haake of Paramus, N.J. However, other types of apparatus suitable for blending polymers and inorganic fillers may be utilized to produce compositions in accordance with the present invention. Films or sheets of the composites may be fabricated by convenient techniques such as compression molding and/or extrusion casting. The water-responsive polymer and the clay may be premixed before fabrication as described above or can be fed separately or simultaneously in to the processing apparatus.

The selection of process equipment for the preparation of the films of the following examples is based on major requirements such as high shear melt processing, sufficient residence time for mixing, and potential for high rate processing. Desirably, the component materials, the PEO resin and the inorganic particulate filler, are suitably intermixed prior to melting. However, the components of the compositions of the present invention may be fed separately in the melt processing apparatus. Conventional extruders having separate feeders are suitable for preparing the compositions of the present invention.

The term melt extrudable as applied to blends and compositions herein means a thermoplastic solid blend having a melt flow rate (MFR) value of not less than about 0.1 grams/10 min, based on ASTM D1238. Desirably, the MFR value of suitable melt-extrudable composition of the present invention ranges from about 0.1 g/10 minutes to about 100 g/10 minutes. More desirably, the MFR value ranges from about 0.2 g/10 min to about 50 g/10 min, and even more desirably, ranges from about 0.8 g/10 minutes to about 20 g/10 minutes to provide desired levels of processability.

The process of preparing the compositions is demonstrated on a lab scale Haake twin-screw extruder described herein. The Haake twin-screw comprises a pair of custom-made, conical screws to provide high melt shear and increased residence time. A general description of the Haake twin-screw extruder is provided as follows. The Haake twin-screw extruder comprises six sections. Section 1 comprises a double flighted forward pumping section having a large screw lead pitch and a high helix angle. Section 2 comprises a double-flighted, forward pumping section having a screw pitch that is smaller than the screw pitch of Section 1. Section 3 comprises a double-flighted, forward pumping section having a screw pitch that is smaller than the screw pitch of Section 2. Section 4 comprises a double-flighted and notched, reversed pumping section having one complete flight with notches. Section 5 comprises a double flighted-notched forward pumping section having two complete flights. Section 6 comprises a double-flighted, forward-pumping section having a screw pitch intermediate the screw pitch of Section 1 and the screw pitch of Section 2. The Haake twin-screw extruder has three heated, extrusion zones with air cooling. The feeding section of the extruder is cooled by water to prevent premature melting of polymer resin. At the end of the extruder, a strand die with two holes each of 3 millimeters in diameter is fitted to the extruder to produce extruded strands of the composite. The extruded strands are cooled on a fan-cooled conveyor belt and then pelletized.

Dry mixtures of polymer pellets and filler were prepared with filler loading levels in the range from about 10 to about 50 percent by weight of filler to weight of polymer resin and filler. Desirably, the filler loading level should be less than about 80 percent by weight of filler to weight of polymer resin. The dry mixtures were flood fed into the twin-screw extruder operating in the range of about 45 to 55 revolutions per minute. For the examples comprising POLYOX® WSR N-80 PEO resin, the extruder temperatures were set at 120°

C., 150° C., 150° C. and 150° C. for the first, second, and third heating zones and the die, respectively. For the examples comprising higher molecular weight POLYOX® WSR N-12K PEO resin, the extruder temperatures were set at 170° C., 180° C., 180° C. and 180° C. for the first, second, and third heating zones and the die, respectively. After extruding, the filled PEO compositions were pelletized and fed through the extruder a second time. During the second extrusion, the extruder was operated at a higher rate of about 75 to 95 revolutions per minute. The second extrusion produced uniform strands having smooth surfaces. The above-described processing design enabled processing of PEO composites under conditions of high shear and sufficient residence time using the short laboratory-scale extruder.

Flushable films were fabricated from the PEO compositions using conventional film making techniques such as compression molding and extrusion casting without stretching, foaming or phase separation techniques. In the examples, the films were prepared from the previously extruded pellets of clay-filled PEO using the Haake laboratory scale extruder described herein. The Haake extruder has a shorter processing length and shorter processing and compounding time than desired. It is understood that films having enhanced breathability can be formed directly from unmodified clay filler particles and a water-responsive polymer using any larger, commercial scale extruder that is capable of blending the components and casting a film from the blend of the components in one step. Such extruders are available from American Leistritz Extruder, Inc. of Somerville, N.J. Advantageously, films can be melt processed from a dry mixture of the components in one processing step without stretching, foaming, phase separation techniques or other additional processing.

The morphology of the films of the examples was analyzed using the following technique. The film to be analyzed was first cryotomed at a sample temperature of about −110° C. using a cryodiamond knife in a Reichert UltraCut S cryotome. The exposed sections of film were vertically mounted on sample holders and sputter coated with about 200 Angstroms of a gold/palladium alloy. Scanning electron microscopy (abbreviated hereinafter as SEM) images were acquired in a JEOL 6400 SEM using a secondary electron signal, at 6 kV operating voltage. Analysis was performed by collection of digital SEM images using a PGT IMIX analyzer at magnifications suitable for resolution of the pores.

Pore size data was accumulated from four randomly selected fields per film sample. Average pore diameter and area covered by pores were also determined. The total number of pores detected and the percent area surface coverage were calculated from the images. The micropore dimensions and percent surface area coverage were determined from the cross sections of two samples of film. The analyzed film sample of FIG. 1 is from a cross-section of a film produced from the composition of Example 3 consisting of about 70 parts of WSR-N-12K PEO resin and about 30 parts of Polargel T unmodified clay filler particles.

FIG. 1 is a SEM image of a cross-section of a film comprising PEO and unmodified clay filler particles and exemplifies a typical cross-section of a film in accordance with the present invention. The cross-section of FIG. 1 illustrates the unique, nanoscale porous morphology characterized by compositions disclosed herein. The unique, nanoscale morphology can be described as randomly distributed void spaces produced by intersection of surfaces of fiber-like elements. These fiber-like elements are formed by the unique interaction of the polymer component and the unmodified clay component of the compositions of the present invention. This unique interaction of the polymer component with the clay particles can result in a penetration of polar polymer molecules of a water-responsive polymer component in the interlayer spaces of clay and layered silicate particles, platelets and stacks and bundles of particles and platelets The binding forces between the platelet bundles are reduced as a result of polymer melt penetrating and enveloping the platelet bundles. Platelets and particles can thus pop apart during melt processing of the composition and form the walls of the cellular network of pores. The resulting cellular network of pores embedded in the polymer phase characterizes the morphology of these films. The cellular network is made up of numerous pores of spherical and/or elliptical-like shape that interconnect to form the network. The pores of the cellular network have a size distribution in the nanoscale range. Desirably, the pores or voided spaces have a size distribution that include pores or voided spaces having a major axis length that is at least about 0.01 microns ($\mu$m), and, more desirably, a major axis length that is at least about 0.1 microns. Desirably, the pore major axis is not more than about 50 microns and, more desirably, the pore major axis is not more than about 10 microns. Key material variables that affect the pore size distribution include: filler particle size distribution, activity of the filler, modification of the filler, and even the selection of the polymer and the molecular weight of the polymer. The area of pore coverage of film cross section of compositions of the present invention desirably is not less than about 0.5 percent and, more desirably, the area of pore coverage is not less than about 1 percent. In other aspects of the invention, the area of pore coverage of film cross section is not more than about 60 percent and, even more desirably, not more that about 30 percent.

Quantitative structural characterization of the film of Example 3 was based on the analysis of the SEM images of the cryotomed cross sections of film as shown in the FIG. 1. Pore size data was accumulated for four randomly selected fields per sample of film. Average pore dimensions were similar for the films of Example 3, about 0.2 microns. The average pore dimension of the films comprising lower molecular weight PEO of Example 2 was about 0.05 to about 0.1 microns. The percentage of area of pore coverage was also calculated for some of the films. The films comprising the Polargel T clay filler had a 1.7 percent area of pore coverage of film cross section and the films comprising the Polargel NF had a 0.88 percent area of pore coverage of film cross section. Structural analysis shows that the PEO-based composites comprising only organoclay, organically modified clay and calcium carbonate as filler have decreased porosity and breathability compared to films comprising clay filler particles that are not organically modified. The non-organically modified clay filler particles produce flushable, breathable composites possessing the unique porous, "house of cards," microstructure described herein.

The water vapor transmission rates (abbreviated hereinafter as WVTR) of the films of the Examples were measured using ASTM Standard E86-90. The water vapor transmission rates of the films are related to the breathability of the films. A film that has a high WVTR also has high breathability. The WVTRs are used herein to characterize the breathability of the films.

Water Vapor Transmission Test and Method

To determine the enhanced breathability of compositions in accordance with the present invention, the water vapor transmission rates of films of several PEO compositions were measured in accordance with ASTM Standard E96-80.

Circular samples measuring 3 inches in diameter were cut from each of the tested materials as well as a control standard material, CELGARD® 2500 microporous film available from Hoechst Celanese Corporation. Individual samples of the test materials and the control material were placed across the open tops of the individual vapometer cups, each vapometer cup containing one hundred milliliters of distilled water. The screw-on flanges of the vapometer cups were tightened to form a seal along the edges of the cup. The sealed cups were placed in a convection type oven set at 100° F. The relative humidity within the oven was not specifically controlled.

The cups were first weighed (weight before) and then immediately placed into the oven. After 24 hours, the cups were removed from the oven and weighed again (weight after). The base WVTR of each material was calculated based on the weight loss ($\Delta W$) and is reported in $g/m^2/24$ hr. The base rate was normalized to the water vapor transmission rate of the control standard, CELGARD® 2500, by multiplying the base rate by a correction factor (CF):

WVTR=Base rate×CF

The correction factor CF was calculated by assuming the WVIR of the CELGARD® 2500 microporous film to be 5000 $g/m^2/24$ hr under predetermined set conditions:

CF=5000/CELGARD® 2500 base rate.

The WVTR adjusted to the film thickness was calculated by multiplying the WVTR by the film thickness in mils (adjusted WVTR) and is reported in $g/m^2/24$ hr/1 mil.

The method and resulting measurements were normalized against a 1 mil film of CELGARD® 2500 as a control standard. The data was adjusted to the film thickness of 1 mil, assuming an inverse proportionality of WVT rate to the film thickness. The WVT rates for clay-filled, low molecular weight POLYOX® N-80 200,000 g/mol PEO films are presented in the Tables. Two clays were employed as fillers, Claytone APA organoclay and the previously mentioned Polargel NF unmodified clay. Unfilled films comprising CELGARD® 2500 are also included as control standards, as well as, unfilled films comprising unfilled POLYOX® N-80 as comparative examples. Based on the same molecular weight base water-responsive resin, the films formed from PEO filled with Polargel unmodified clay particles possess enhanced WVT rates compared to films formed from unfilled PEO and from PEO filled with organically modified clay or other non-clay fillers. When normalized to a film thickness of 1 mil, a WVT rate of about 5490 grams per square meter per day (abbreviated hereinafter as $g/m^2 \cdot day$) is estimated for the Polargel NF clay-filled low molecular weight PEO films in Example 2 of Table II.

WVT rates for various filled films of high molecular weight POLYOX® WSR-N-12K 1,000,000 glmol PEO and low molecular weight POLYOX® N80 200,000 g/mol PEO are also presented. WVVT rates of greater than WVT rates of greater than 1000 $g/m^2/24$ hr are considered as breathable for the purposes of the present invention. According to certain aspects of the invention, the films of the invention can advantageously provide an enhanced WVTR value. In one embodiment of the present the invention, the WVTR is at least about 1000 $g/m^2/24$ hr/mil (grams per square meter, per 24 hours, per 0.001 inch of film thickness). Optionally, the WVTR is at least about 3000 $g/m^2/24$ hr/mil, and more desirably is at least about 4000 $g/m^2/24$ hr/mil. In another embodiment, the WVTR does not exceed about 50,000 $g/m^2/24$ hr/mil. Alternatively, the WVTR value does not exceed about 30,000 $g/m^2/24$ hr/mil. For both molecular weights, the films comprising Polargel T and Polargel NF unmodified clay fillers demonstrate higher levels of breathability compared to similar unfilled and filled films comprising Claytone APA organically modified clay filler or conventional fillers. The enhanced breathability of the films formed from the PEO compositions comprising unmodified clay filler particles is believed to result from the unique, cellular nanostructure of the blend of the PEO polymer and the unmodified clay filler. The unique, cellular nanostructure contains a network of nanoscale pores of void spaces distributed fairly uniformly throughout the composite matrix and impart desired porosity and breathability to films made from the compositions.

WVT rates of thin films comprising low molecular weight POLYOX® N80 PEO are presented. The data in Table I show that significant level of breathability can be achieved when the film thickness is reduced down to about 1 to 2 mil. The unexpectedly enhanced level of breathability achieved with clay-filled PEO films suggests that these films can be utilized as a breathable outercovers for various flushable and/or environmentally degradable products. This technology may permit an efficient alternative approach for development of alternative breathable materials for flushable and/or environmentally degradable applications. Further, this technology offers various processing advantages compared to the conventional techniques utilizing stretched processing or a phase separation method to produce breathable films by eliminating additional processing steps and the accompanying costs.

The breathable films of the present invention can be used to make a variety of personal care and health care products. The films can optionally be laminated to a nonwoven fabric. Examples of suitable fibers for the nonwoven fabric include organic fibers such as cellulosic fibers; synthetic fibers made from thermoplastic polymers such as polyester or polyamide; and synthetic fibers composed of thermoplastic polymer such as polypropylene fibers. The nonwoven fabric can be optionally coated or otherwise treated to impart desired level of liquid impermeability. Optionally, breathable films of the present invention can be modified or otherwise treated to enhance the films' liquid-barrier property to a desired level. To enhance liquid-barrier property of breathable films, a thin additional liquid barrier layer can be coated or coextruded with the breathable film.

COMPARATIVE EXAMPLE A

To determine the breathability or WVT rate of an unfilled, water-soluble film for comparative purposes, films of varying thickness were manufactured from an unfilled PEO resin. The unfilled PEO resin used in Comparative Example A was obtained in powder form from Union Carbide. The particular PEO resin use in this Comparative Example A is sold under the trade designation POLYOX® WSR N-80 and has a reported average molecular weight of approximately 200,000 g/mol. Before forming into a film, this low molecular weight, unfilled PEO powder was first pelletized by Planet Polymer Technologies of San Diego Calif. using a twin-screw extruder and air-cooled belt. The PEO pellets then were compression molded into films of thicknesses of 1.3, 1.6, 2.4, 2.6, 6.3 and 7.3 mils using a Carver laboratory hot press. Carver hot presses are available from Fred S. Carver, Inc. of Menomonee, Wis. The water vapor transmissions of the unfilled PEO films were tested in accordance with ASTM E 96-80. The results of the tests are reported in Tables I, II and III for comparative purposes.

COMPARATIVE EXAMPLE B

As a standard for comparison, microporous, breathable films were obtained from Hoechst Celanese Corporation and tested under the same conditions. The microporous films were obtained from Hoechst Celanese Corporation and are commercially available under the trademark CELGARD® 2500. The films that were obtained and tested were 1 mil in thickness and had a mean adjusted water vapor transmission rate of 5000 grams of water vapor per square meter of film per day according our tests in accordance with ASTM E 96-80. The results of the water vapor transmission tests are reported in Tables I, II and III for comparative purposes.

EXAMPLE 1

Breathable, water-responsive films were produced from 70 parts by weight of POLYOX® WSR N-80 PEO pellets and 30 parts by weight of Claytone APA organoclay filler. The above two components were premixed and the resulting dry mixture was flood fed into the Haake twin screw extruder described above. To form a uniform blend from the mixture, the extruder was operated at a rate in the range of about 45 to 55 revolutions per minute and temperatures of 120° C., 150° C., 150° C., and 150° C. for the first, second, and third heating zones and the die, respectively. After extrusion, the PEO and clay blend was cooled using an air-cooled conveyor belt. The cooled PEO/clay blend was pelletized. The PEO and clay pellets were again fed through the Haake extruder to form a more uniform blend. This second extrusion produced uniform strands of a clay filled PEO composite having smooth surfaces. The strands produced from the second extrusion were again pelletized.

Films of varying thickness, 1.2, 1.4, 2.2, 2.6, 2.7, 6.5 and 7.6 mils, were produced from the pellets of the second extrusion. These films were formed by compression molding of the pellets using the Carver laboratory hot press described above. The water vapor transmission properties of these films were tested in accordance with ASTM E 96-80 as were the above two Comparative Examples and the following Examples. The results of the water vapor transmission tests of the films and their thicknesses are reported in Tables I, II and III.

EXAMPLE 2

Films were produced from 70 parts by weight of POLYOX® WSR N-80 PEO resin and 30 parts by weight of Polargel NF clay filler by the same procedure as described for Example 1 above. Films of this breathable, water-responsive composition were pressed in thickness of 2.3, 2.5, 2.7, 2.8, 3.0 and 6.3 mils and tested in accordance with ASTM E 96-80. The results of the water vapor transmission tests are reported in Tables I, II and III.

EXAMPLE 3

Films were produced from 70 parts by weight of the POLYOX® WSR N-12K PEO resin and 30 parts by weight of Polargel T clay filler by the same procedure as described for Example 1 above. POLYOX® WSR N-12K PEO resin has a reported average molecular weight of approximately 1,000,000 g/mol. Films of this breathable, water-responsive composition were pressed in thickness of 7.8 and 8.2 mils and tested in accordance with ASTM E 96-80. The results are reported in Table III.

EXAMPLE 4

Films were produced from 55 parts by weight of POLYOX® WSR N-12K PEO resin and 45 parts by weight of SUPERMITE® calcium carbonate particulate filler material that had been surface coated with 6 weight percent, based on weight of the filler material, with Dow Corning 193 silicone glycol surfactant (abbreviated as 193S in the accompanying tables). The SUPERMITE® calcium carbonate particulate filler was obtained from ECC International and was surface treated with the silicone glycol to improve interaction of the calcium carbonate particle surfaces with the PEO resin matrix. A dry mixture of the treated filler and the PEO was flood fed into the Haake twin screw extruder. The extruder was operated at a rate in the range of about 45 to 55 revolutions per minute and temperatures set at 170° C., 180° C., 180° C., and 180° C. for the first, second, and third heating zones and the die, respectively. After extrusion, the PEO and calcium carbonate blend was pelletized using air-cooled conveyor belt and fed through the Haake extruder a second time to produce a more uniform blend. The second extrusion produced uniform strands having smooth surfaces. The strands were then pelletized and films were produced in thicknesses of 4.5 and 4.7 mils by compression molding with the Carver Laboratory hot press. The films were tested in accordance with ASTM E 96-80. The results are reported in Table III.

EXAMPLE 5

A film was produced from 55 parts by weight of POLYOX® WSR N-12K PEO resin and 45 parts by weight of SUPERMITE® calcium carbonate particulate filler material that had been surface coated with 6 weight percent of Dow Corning FF 400 modifier, based on weight of the filler material,. A 5.8 mil thick film was produced by the same procedure of Example 4 above, except the calcium carbonate filler surfaces was modified with Dow Corning FF 400 modifier. The film was tested in accordance with ASTM E 96-80 and the results are reported in Table III.

EXAMPLE 6

A film was produced from 60 parts by weight of POLYOX® WSR N-80 PEO resin and 40 parts by weight of Claytone APA organoclay filler by the same procedure as described for Example 1 above. A film of this breathable, water-responsive composition was pressed to a thickness of 1.3 mils and tested in accordance with ASTM E 96-80. The results of the water vapor transmission test are reported in Table I.

It is to be understood that the above examples are illustrative embodiments and that the present invention is not to be limited by any of the examples or details in the description. Rather, the claims appended hereto are to be construed broadly within the scope and spirit of the present invention. Particularly, it is to be understood that the invention includes films, multilayer films, fibers, multicomponent fibers and articles in which the claimed compositions are employed.

We claim:

1. A composition of matter comprising a breathable melt extruded blend, the blend comprising a water-responsive polymer and greater than about 1 weight percent of clay particles, layered silicate particles or a mixture thereof relative to the sum of the weight of the water-responsive polymer, the clay particles and the layered silicate particles and the breathable melt extruded blend having a water vapor transmission rate of at least about 1000 g/m$^2$/24 hr/mil according to ASTM standard E 96-80.

2. The composition of claim 1, wherein the water-responsive polymer is a polymer of ethylene oxide.

3. The composition of claim 2, wherein the water-responsive polymer is a graft copolymer of ethylene oxide.

4. The composition of claim 2, wherein the polymer of ethylene oxide has a molecular weight within the range from about 100,000 grams per mol to about 4,000,000 grams per mol.

5. The composition of claim 4, wherein the polymer of ethylene oxide has a molecular weight within the range from about 200,000 grams per mol to about 2,000,000 grams per mol.

6. The composition of claim 1, wherein composition comprises greater that 10 weight percent of clay particles relative to the sum of the weight of the water-responsive polymer and the clay particles.

7. The composition of claim 2, wherein composition comprises greater that 20 weight percent of unmodified clay particles relative to the sum of the weight of the water-responsive polymer and the clay particles.

8. The composition of claim 6, wherein the clay particles comprise smectite clay particles.

9. The composition of claim 6, the clay particles comprise montmorillonite clay or bentonite clay particles.

10. The composition of claim 6, wherein the clay particles comprise sodium bentonite clay particles.

11. A film comprising the composition of claim 1.

12. The film of claim 11, wherein the film is formed by melt extrusion.

13. An article comprising the composition of claim 1.

14. A composition of matter comprising a melt extruded blend of a dry mixture of a water-responsive polymer of ethylene oxide having an average molecular weight within the range of from about 100,000 grams per mol to about 8,000,000 grams per mol and greater than 1 weight percent clay particles, layered silicate particles or a mixture thereof relative to the sum of the weight of the water-responsive polymer of ethylene oxide, the clay particles and the layered silicate particles.

15. The composition of matter of claim 14, wherein the water-responsive polymer of ethylene oxide has an average molecular weight within the range of from about 200,000 grams per mol to about 4,000,000 grams per mol.

16. The composition of matter of claim 15, wherein the water-responsive polymer of ethylene oxide has an average molecular weight within the range of from about 200,000 grams per mol to about 1,000,000 grams per mol.

17. The composition of matter of claim 16, wherein the blend comprises greater than 5 weight percent of bentonite clay particles relative to the sum of the weight of the water-responsive polymer of ethylene oxide, the clay particles and the layered silicate particles.

18. The composition of matter of claim 14, wherein the clay particles and layered silicate particles consist essentially of particles with an average particle size of not more than about 50 microns.

19. A composition of matter comprising a melt extruded blend of:
   a) a water-responsive polymer of ethylene oxide having a molecular weight within the range of from about 100,000 grams per mol to about 8,000,000 grams per mol; and
   b) from about 1 weight percent to about 50 weight percent of clay particles, layered silicate particles or a mixture clay and layered silicate particles based on the sum of the weight of the water responsive polymer, the clay particles and the layered silicate particles, wherein the average particle size is not greater than about 10 microns.

20. The composition of matter of claim 19, wherein the composition possesses a nanoscale microstructure characterized as a network of nanoscale pores of void spaces distributed through the water-responsive polymer phase that forms the matrix of the composition wherein the void spaces are produced by intersection of surfaces of fiber-like elements formed from the water-responsive polymer and clay particles of the composition.

* * * * *